United States Patent
Lee et al.

(10) Patent No.: US 9,390,200 B2
(45) Date of Patent: Jul. 12, 2016

(54) LOCAL CACHING DEVICE, SYSTEM AND METHOD FOR PROVIDING CONTENT CACHING SERVICE

(71) Applicant: SK Telecom Co., Ltd., Seoul (KR)

(72) Inventors: Jong Min Lee, Seongnam-si (KR); Kyung Jun Lee, Seongnam-si (KR); A Rum Kwon, Gwangju (KR); Young Jae Shim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 199 days.

(21) Appl. No.: 13/908,572

(22) Filed: Jun. 3, 2013

(65) Prior Publication Data

US 2013/0326133 A1    Dec. 5, 2013

(30) Foreign Application Priority Data

Jun. 1, 2012   (KR) .......................... 10-2012-0059293

(51) Int. Cl.
  *G06F 17/30* (2006.01)
  *G06F 12/08* (2006.01)
  *H04L 29/08* (2006.01)

(52) U.S. Cl.
  CPC ...... *G06F 17/30982* (2013.01); *G06F 12/0875* (2013.01); *G06F 17/30902* (2013.01); *H04L 67/2842* (2013.01); *H04L 67/2852* (2013.01)

(58) Field of Classification Search
  CPC .............. G06F 12/0875; G06F 12/084; G06F 17/30982; G06F 17/30902; H04L 67/2852; H04L 67/2842; H04L 67/1097
  See application file for complete search history.

(56) References Cited

U.S. PATENT DOCUMENTS

| | | | | |
|---|---|---|---|---|
| 5,991,306 A | * | 11/1999 | Burns et al. | 707/E17.12 |
| 6,128,655 A | * | 10/2000 | Fields et al. | 709/219 |
| 2005/0102427 A1 | * | 5/2005 | Yokota et al. | 709/245 |
| 2007/0050491 A1 | * | 3/2007 | Kataoka | H04L 67/2814 709/223 |
| 2011/0208828 A1 | * | 8/2011 | Sakakihara et al. | 709/217 |
| 2012/0030212 A1 | * | 2/2012 | Koopmans et al. | 707/741 |
| 2012/0117201 A1 | * | 5/2012 | Arolovitch et al. | 709/219 |
| 2014/0310374 A1 | * | 10/2014 | Lee et al. | 709/213 |

FOREIGN PATENT DOCUMENTS

| | | |
|---|---|---|
| KR | 1020100050597 A | 5/2010 |
| KR | 1020100056934 A | 5/2010 |
| KR | 1020110014120 A | 2/2011 |
| WO | 0198904 A1 | 12/2001 |
| WO | 2012016226 A1 | 2/2012 |

OTHER PUBLICATIONS

Chinese Office Action for corresponding Chinese Patent Application No. 201310208422.3 issued on Nov. 24, 2015.

* cited by examiner

*Primary Examiner* — Michael Krofcheck
(74) *Attorney, Agent, or Firm* — Hauptman Ham, LLP (57) ABSTRACT

The present disclosure relates to a local caching device, system and method for providing a content caching service. The local caching device receives, from a content provider, at least one part of content requested by a user terminal and then, based on the received part of the requested content, determines whether the requested content is stored in a storage unit. If the requested content is stored, the local caching device registers flow information of the requested content in the storage unit. When content having the same flow information as the registered flow information is requested, the local caching device determines based on content address information whether the requested content is stored.

15 Claims, 6 Drawing Sheets

| Source Address Information | Destination Address Information |
|---|---|
| Server2_IP | UE_IP,UE_Port |
| Server1_IP | UE_IP,UE_Port |
| ⋮ | ⋮ |

(b)

| Content Identification Information | Content Address Information |
|---|---|
| Content-A | www.abc.com/hls_300k_01.ts |
| Content-B | www.abc.com/hls_300k_02.ts |
| Content-C | www.abc.com/hls_500k_03.ts |
| ⋮ | ⋮ |

LOCAL CACHING DEVICE, SYSTEM AND METHOD FOR PROVIDING CONTENT CACHING SERVICE

CROSS-REFERENCE TO RELATED APPLICATION

This application claims priority to and benefit of Patent Application Serial No. 10-2012-0059293, filed on Jun. 1, 2012 in Korea, which is hereby incorporated by reference herein in its entirety.

TECHNICAL FIELD

The present disclosure relates to a local caching device and method for providing a content caching service to prevent, in some embodiments, redundant content transmission and hence reduce traffic on a network.

BACKGROUND

The statements in this section merely provide background information related to the present disclosure and may not constitute prior art.

With a rapid propagation of smart phones and continuing increases in the number of content providers using smart phones, there is a growing tendency toward an increase in traffic of mobile communication networks. The inventor(s) has experienced that this may often cause the deterioration of service quality due to a decrease in a transmission rate of contents such as videos, audios, images, applications, and the like.

Meanwhile, a recent growth of content transmission technology allows transmission of large-capacity files in online video services such as VOD (Video On Demand) or live streaming, in music streaming services, and in file upload and download. Thus, a variety of services for delivering large-capacity contents are provided.

Normally such content providing services tend to deliver redundant contents to users in the same domain or the same radio coverage even though the frequency of content delivery depends on its popularity. The inventor(s) has noted that as various content providing services are widely used today, transmission of redundant contents occupies an increasing part of network traffic.

In a situation that network traffic sharply increases due to transmission of large-capacity contents, the inventor(s) has experienced that transmission of redundant contents further increases a traffic load of the communication network. In view of this, the inventor(s) has noted that a CDN (Content Delivery Network) service is used to stably deliver various types of contents such as movies, music video, and the like to end-users. In the CDN service, replicas of contents are stored in a plurality of local cache servers distributed in a network. A load balancer, also referred to as a GLB (Global Load Balance) server, selects an optimal cache server among the local cache servers, and the selected cache server delivers requested content to a user terminal.

This CDN architecture provides a solution to obviate several problems including data loss, bottlenecks, reduced transmission rate, network instability such as discontinuous data transmission, and the like.

In the CDN service, content caching technology is used for selectively caching contents in a plurality of local caching devices distributed in a network. Content caching should consider the size of a storage space in a local caching device, the time required to determine whether requested content is cached in the local caching device, and a cache hit rate that indicates a percentage that the requested contents are contained in the local caching device.

Particularly, in case of adapted content providing techniques (e.g., HTTP Live Streaming (HLS)) to transmit content by varying its resolution according to link quality or device performance, content is divided into a plurality of chunks and transmitted by the chunks. Therefore, if it is determined on the basis of parts of content whether the content is cached, service efficiency may be lowered due to a small amount of data transmitted from a local caching device to a user terminal. Additionally, some adapted content providing techniques periodically change an encryption key of content. If such an encryption key is changed, content data is changed through encryption in spite of having the same URL, and hence it is impossible to determine on the basis of URL whether the content is cached.

SUMMARY

In accordance with some embodiments, a local caching device includes a storage unit, a communication interface, and a controller. The storage unit is configured to store some or all contents provided from at least one content provider to at least one user terminal. The communication interface is configured to transmit and receive data between the at least one content provider and the at least one user terminal. The controller is configured to receive, from the content provider, content requested by the user terminal, register flow information of the requested content if the storage unit stores content which is at least partially identical to the received content, and determine whether the requested content is stored in the storage unit when content having the same flow information as the registered flow information is requested.

In accordance with some embodiments, the local caching device is configured to receive, from a content provider, at least one part of content requested by a user terminal; determine whether the requested content is stored in a storage unit of the local caching device, based on the received at least one part of the requested content; register flow information of the requested content in a flow information table of the storage unit if the requested content is stored in the storage unit. And when content having the same flow information as the registered flow information is requested, the local caching device is configured to determine whether the requested content is stored in the storage unit, based on content address information.

In accordance with some embodiments, the system of providing a content caching service comprises a content provider and a local caching device. The content provider is configured to providing some or all contents. The local caching device includes a storage unit, a communication interface, and a controller. The storage unit is configured to store some or all contents provided from at least one content provider to at least one user terminal. The communication interface is configured to transmit and receive data between the at least one content provider and the at least one user terminal. The controller is configured to receive, from the content provider, content requested by the user terminal, register flow information of the requested content if the storage unit stores content which is at least partially identical to the received content, and determine whether the requested content is stored in the storage unit when content having the same flow information as the registered flow information is requested.

DETAILED DESCRIPTION

In the following description, numerous specific details are set forth. However, it is understood that various embodiments of the disclosure are practiced without these specific details. In other instances, well-known functions or configurations have not been shown in detail in order not to obscure understanding of this description. The same reference numbers will be used throughout this specification to refer to the same or like parts.

To aid in understanding of the present disclosure, the terms used in the following description are defined as follows.

'Flow information' refers to information that defines a flow associated with transmission of specific content to a user terminal. In some embodiments, the flow information may be formed as at least one combination of IP address information, port information and protocol information of both a source and a destination. In some embodiments, the flow information is formed as a combination of IP address information of a destination, port information of a destination, and IP address information of a source in order to identify a flow of adapted type content.

'Content address information' refers to the location of content in a network and may be a URL (Uniform Resource Locator) including a protocol type, the domain name or IP address of a content provider, and a file path name of content, for example.

'Content identification information' is information for identifying content stored in a local caching device. In some embodiments, the content identification information refers to a value generated by extracting at least part of a content request message or processing (e.g., hashing) at least part of the content. In at least one embodiment, the content identification information is generated on the basis of at least part of the content. For example, the content identification information includes at least one of prefix information having a predetermined length, a hash value obtained by processing the prefix information using a predetermined hash function, and metadata of the content.

'Content' can be, for example, text message, web content, video, audio, images, applications, and etc. 'Content' can be provided in a streaming or download manner. 'Content' can be divided into one or more parts in a predetermined chunk unit and stored, wholly or partly, at a single or multiple storages of at least one local caching device, at least one user terminal, and/or at least one content providing device of one or more content providers.

'A cache hit' refers to the existence of requested content in a cache. In some embodiments of this disclosure, a "cache hit" means that the requested content is contained in one or more local caching devices.

Figure 1:
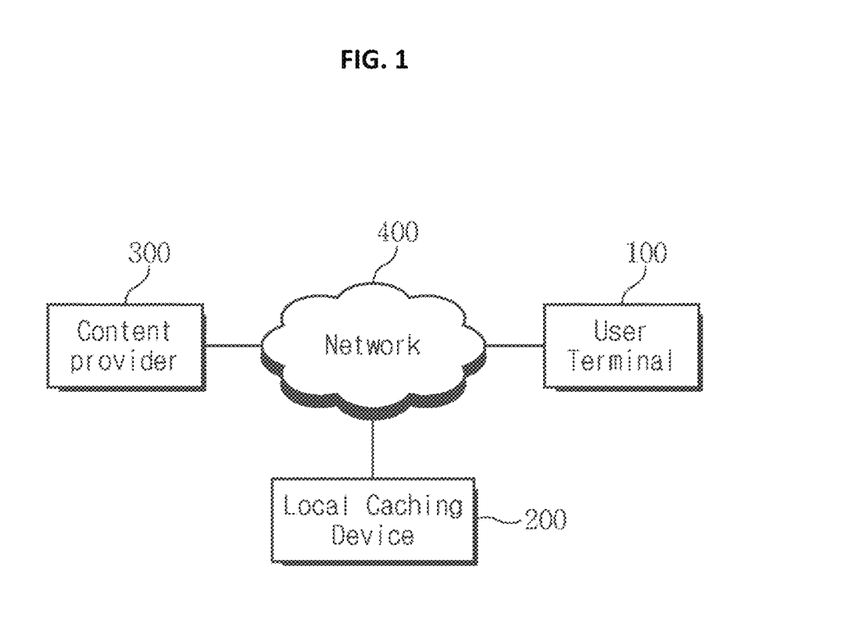
FIG. 1 is a schematic block diagram of a content caching service system in accordance with at least one embodiment._

FIG. 1 is a schematic block diagram of a content caching service system in accordance with at least one embodiment.

Referring to FIG. 1, the content caching service system includes at least one user terminal 100 (just shown as a single user terminal in FIG. 1 for convenience), at least one local caching device 200 (just shown as a single local caching device in FIG. 1 for convenience), and at least one content provider 300 (just shown as a single content provider in FIG. 1 for convenience), which are connected to each other through a network 400.

The user terminal 100, also referred to user equipment (UE), is a device that is connected to the network 400 to use content provided through the network 400. The user terminal 100 requests the content provider 300 to provide specific content and receives the requested content or other content transmitted from either the content provider 300 or the local caching device 200 at the request of the user terminal 100. The user terminal 100 may include a desktop PC, a notebook computer, a tablet PC, a smart phone, a PDA (Personal Digital Assistant), an Internet TV (i.e., a smart TV), or any other electronic device having a communication function.

The local caching device 200 is distributed in the network 400, stores contents provided by the content provider 300 temporarily or for a predetermined time, and provides the stored contents to the user terminal 100 in place of the content provider 300 when the user terminal 100 requests the content. For this, the local caching device 200 performs, based on various caching schemes, a caching operation of copying some or all contents provided to the user terminal 100 by the content provider 300 and storing the copied content. In addition, when a content request message being transmitted from the user terminal 100 to the content provider 300 is received, the local caching device 200 compares flow information extracted from the content request message with flow information of a previous cache hit. In this disclosure, flow information of a previous cache hit refers to flow information of a currently activated session which corresponds to a cache hit made using a part of content as a key.

If the extracted flow information is identical to that of a previous cache hit, the local caching device 200 determines, based on content address information of content requested by the user terminal 100, whether the requested content is stored or not (namely, whether it results in a cache hit or a cache miss). Otherwise, the local caching device 200 receives the requested content from the content provider 300 and then, by using at least part of the received content as a key, determines whether the requested content is stored or not. Furthermore, in case of adapted type content, the local caching device 200 determines a cache hit or a cache miss by using at least part of content, and in case of a cache hit, registers flow information of the content in a flow information table. Thereafter, when there is a request for content having flow information matched with that registered in the flow information table, the local caching device 200 simply determines a cache hit or a cache miss on the basis of content address information. Therefore, with regard to adapted type content divided into chunks and transmitted by the chunks, the amount of transmittable data from the local caching device 200 to the user terminal 100 is increased and consequently service efficiency is enhanced.

As the result of determination based on either at least part of the received content or content address information, if the requested content is not stored (i.e., a cache miss), the local caching device 200 receives the requested content from the content provider 300 and then transmits the received content to the user terminal 100.

As the result of determination based on either at least part of the received content or content address information, if the requested content is stored (i.e., a cache hit), the local caching device 200 retrieves the stored content and then transmits the stored content to the user terminal 100.

In order to determine a cache hit or a cache miss as discussed above, the local caching device 200 extracts, from the content request message, IP address information and port information of the user terminal 100 and IP address of the content provider 300, and manages a combination of them as flow information of a cache hit. Additionally, the local caching device 200 matches the content identification information, created using at least part of the requested content, with content address information, and manages them. Here, such management of flow information of a cache hit, content identification information and content address information is performed regarding contents stored in the local caching device 200.

In case where the content provider 300 provides contents through an adapted content transmission technique, for example, in case of HLS (HTTP Live Streaming), each content includes two or more content data having different resolutions, and each content data is divided into a plurality of chunks. Then specific content data having a resolution corresponding to link quality or device performance is selected and transmitted by the chunks. Additionally, content may be encrypted through an encryption key periodically changed.

When any content is requested for the first time, corresponding flow information is not yet registered in the flow information table. Therefore, the local caching device 200 receives a part of the requested content from the content provider 300 and then checks, by using the received part as a key, whether the requested content is stored. Thus, considering a change or not of an encryption key, the local caching device 200 can exactly determine caching or not of the content and, in case of a cache hit, regard the remaining data of stored content as being encrypted using the same encryption key. Accordingly, when the user terminal 100 requests the remaining data, the local caching device 200 can check a cache hit or not of the requested content by simply using content address information only and thereby enhance the service efficiency.

The configuration and operation of the local caching device 200 will be described in detail later.

Although the local caching device 200 is illustrated as a single device in FIG. 1, this is exemplary only and not to be considered as a limitation. Alternatively, a plurality of local caching devices 200 may be distributed in the network 400.

The content provider 300 is a service providing device that provides various types of contents, for example, video files, audio files, web pages, etc. through the network 400 in a streaming or download manner. The content provider 300 may be a server (e.g., a computer system) that provides video sharing sites through which a charged or free video is uploaded, viewed or shared, application stores through which mobile contents are sold, an IPTV broadcast service through the Internet, and the like.

The network 400 through which contents are transmitted among the user terminal 100, the local caching device 200 and the content provider 300 may include various communication networks currently used or expected to be used in the future and their unified networks. Specifically, the network 400 may include IP based wired/wireless communication networks such as the Internet, mobile communication networks such as the LTE (Long Term Evolution) network and the WCDMA network, various wireless networks such as the Wi-Fi network, and any other mobile network. The local caching device 200 can be used to reduce redundant content transmission and traffic in such a network.

Particularly, in some embodiments, the local caching device 200 may be distributed at edges of the network 400. This case is shown in FIG. 2.

Figure 2:
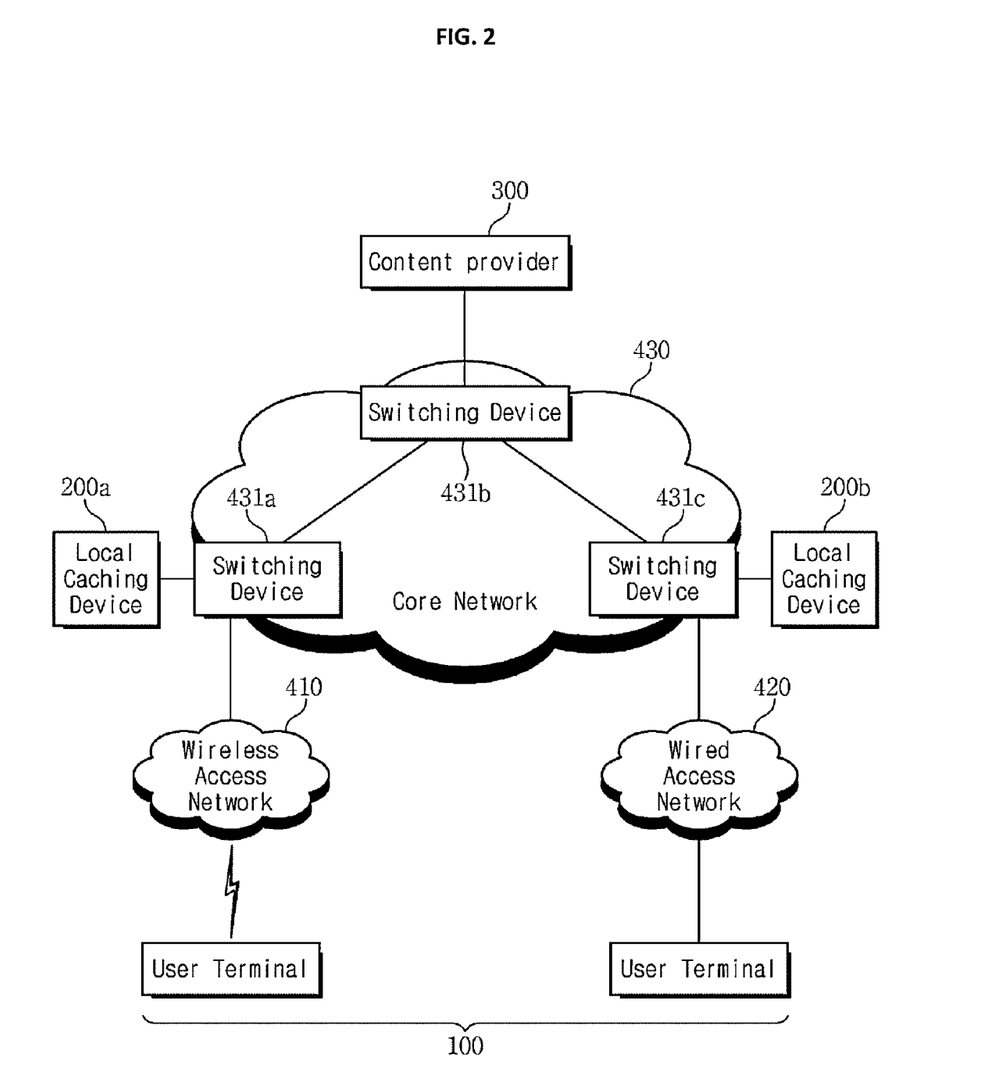
FIG. 2 is a schematic block diagram of a local caching device distribution structure in the content caching service system in accordance with at least one embodiment.

FIG. 2 is a schematic block diagram of a local caching device distribution structure in the content caching service system in accordance with at least one embodiment.

Referring to FIGS. 1 and 2, the network 400 includes wireless or wired access networks 410 and 420 to which the user terminal 100 is connected, and a core network 430 that connects the wireless or wired access networks 410 and 420.

The wireless access network 410 refers to a subscriber network capable of transmitting or receiving data to or from the user terminal 100 in various wireless communication manners, and may include a mobile communication network and Wi-Fi network. The wired access network 420 refers to a subscriber network connected to the user terminal 100 in a wired manner to transmit or receive data to or from the user terminal 100, and may include FTTH (Fiber To The Home).

The local caching devices 200 (also denoted by reference numerals 200a and 200b in FIG. 2) are distributed at edge nodes of the network 400. Specifically, the local caching devices 200a and 200b are connected to switching devices (e.g., routers, etc.) 431a, 431b and 431c which are edge nodes of the core network 430 and linked to the wireless/wired access networks 410 and 420. Therefore, each of the local caching devices 200a and 200b can provide the content caching service to the user terminal 100 connected to the wireless/wired access networks 410 and 420.

Particularly, when the content caching service is applied to a mobile network such as a mobile communication network, the local caching device 200 may be distributed in each wireless access network including a plurality of base stations (BSs), also referred to as base transceiver stations (BTSs), nodeBs, eNodeBs, etc., and a base station controller (BSC) such as a radio network controller (RNC) in the mobile network. In this case, the local caching device 200 may be connected to an edge node (e.g., a switching device) of a mobile communication system connected to each wireless access network to support transmission of content to a user terminal connected to each wireless access network.

Figure 3:
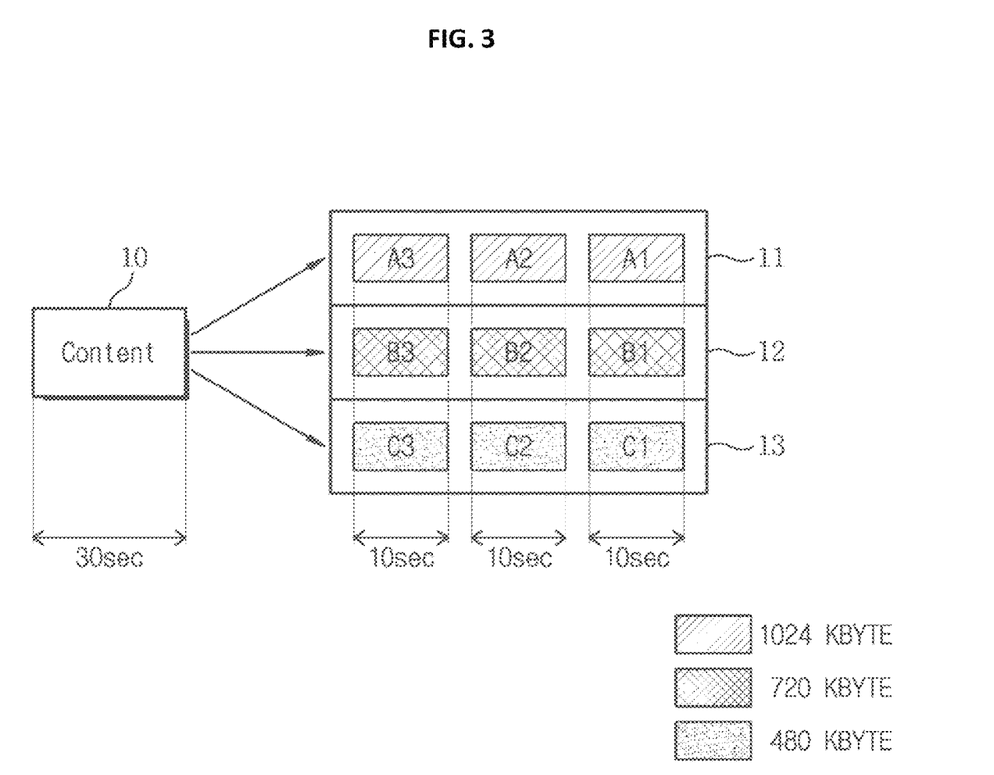
FIG. 3 is a schematic diagram of a structure of adapted type content in accordance with at least one embodiment.

In order to promote understanding of the content caching service, FIG. 3 shows, in a schematic diagram, a structure of adapted type content in accordance with at least one embodiment.

Referring to FIG. 3, in case of an adapted content transmission technique such as HLS, content 10 may include two or more content data 11, 12 and 13 encoded with different resolutions. In other words, each of content data 11, 12 and 13 represents the same content 10, but at a different resolution. In some embodiments, content data 11, 12 and 13 has a resolution of 1024K, 720K and 480K, for example. In this case, the content 10 may be provided to the user terminal 100 at a specific resolution selected from 1024K, 720K and 480K, depending on link quality or device performance. In at least one embodiment, the specific resolution is variable as the link quality or device performance changes.

Additionally, each content data 11, 12 and 13 encoded with different resolutions is divided into a plurality of chunks A1~A3, B1~B3 and C1~C3 having a given size. In case of video content, for example, the size of single chunk data may be set to about ten seconds.

As such, the content 10 having various resolutions is transmitted by the chunks after content data with suitable resolution is selected depending on at least one of link quality and performance of the user terminal 100.

If content is not an adapted type, the GET message is transmitted normally about once. However, in case of adapted type content, a content request may occur by the chunks and therefore the GET message is transmitted several times.

Additionally, the adapted type content 10 may be encrypted, and an encryption key may be periodically changed. In some embodiments, all content data 11, 12 and 13 of the content 10 are encrypted with the same encryption key. Therefore, if the encryption key is changed, the content data transmitted is also changed but content address information of the content 10 is unchanged.

When the adapted type content 10 is requested, the local caching device 200 receives at least part of the requested content from the content provider 300 in response to the first GET message, compares contents by using the received part as a key, and checks whether the requested content is stored, especially, whether any content encrypted with a specific encryption key currently used by the content provider 300 is stored. If the local caching device 200 caches the requested content, but an encryption key thereof is changed, the local caching device 200 determines that the requested content is not stored when determining on the basis of at least part of the received content whether the requested content is stored or not. If an encryption key is not changed, the local caching device 200 determines that the requested content is stored.

That is to say, as the result of determination using at least part of content as a key, if the same content is stored, it is determined that content data encrypted with a specific encryption key currently applied to the requested content is stored in the local caching device 200. Therefore, in response to subsequent requests for the adapted type content 10 from the user terminal 100, the local caching device 200 can determine on the basis of content address information whether the requested content is stored or not.

For this, the local caching device 200 stores flow information regarding a content request of a previous cache hit. Thereafter, whenever a content request message is received, the local caching device 200 extracts flow information from the received message and checks whether the extracted flow information is identical to the stored flow information of a previous cache hit. If not identical, the local caching device 200 determines a cache hit or not through comparison of at least part of content. If identical, the local caching device 200 determines a cache hit or not of the requested content through a simple comparison of the content address information only.

Additionally, for the above operation, the local caching device 200 may have a flow information table and a content address management table. The flow information table manages flow information regarding a content request of a cache hit. The content address management table manages content identification information and content address information regarding respective contents stored in the local caching device 200.

Figure 4:
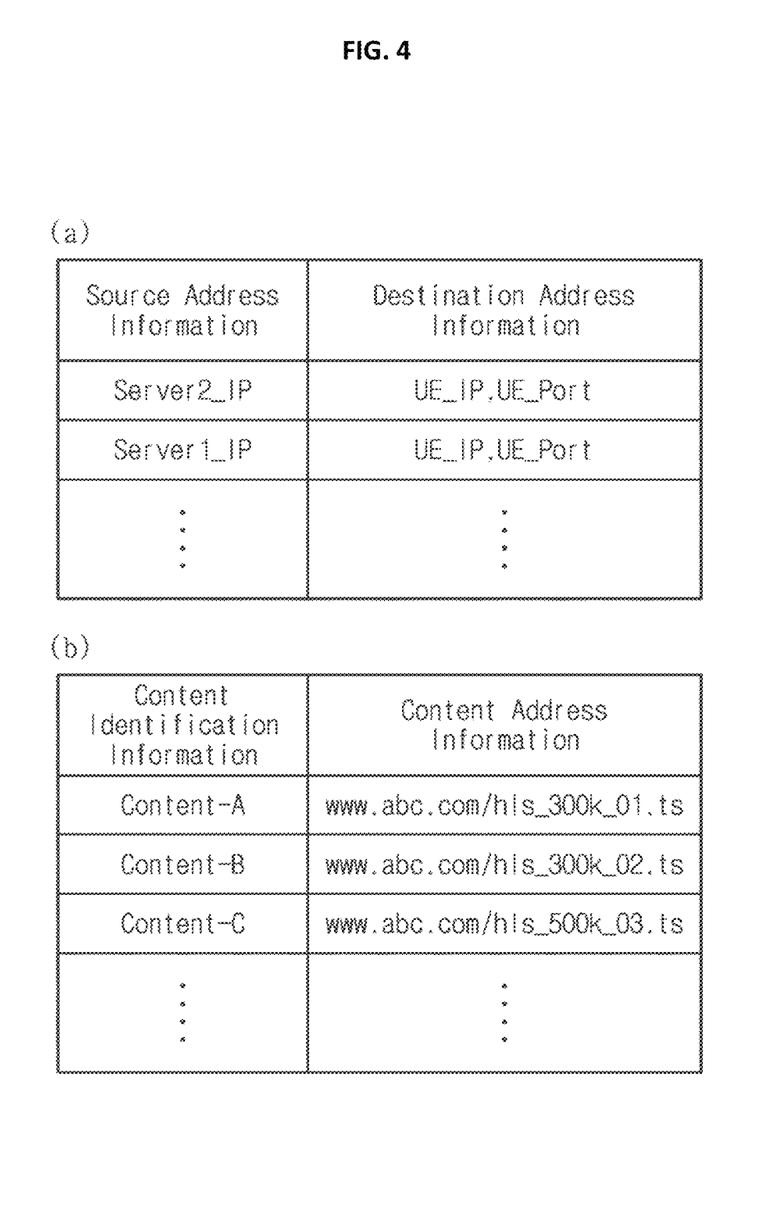
FIG. 4 is a schematic diagram of an exemplary flow information table and an exemplary content address management table used in the local caching device in accordance with at least one embodiment.

Section (a) of FIG. 4 shows an example of the flow information table in which source address information and destination address information are matched with each other as flow information regarding a content request of a cache hit. Here, the source address information indicates a source of content of a cache hit, namely, the address information of the content provider 300, and is set as IP address information (e.g., Server1_IP, Sever2_IP, etc.). The destination address information indicates a destination of content of a cache hit, namely, the address information of the user terminal 100, and is set as both IP address information (e.g., UE_IP) and port information (e.g., UE_Port).

Section (b) of FIG. 4 shows an example of the content address management table. In some embodiments, the content address management table includes a first field that records content identification information created using at least part of each of contents stored in the local caching device 200, and a second field that records one or more content address information matched with the content identification information. As defined above, the content identification information is created by extracting at least part of corresponding content or processing (e.g., hashing) at least part of the content. For example, the content identification information may include at least one of prefix information having a predetermined length, a hash value obtained by processing the prefix information using a predetermined hash function, and metadata of the content.

Now, the configuration and operation of the local caching device 200 will be described in detail with reference to FIG. 5.

Figure 5:
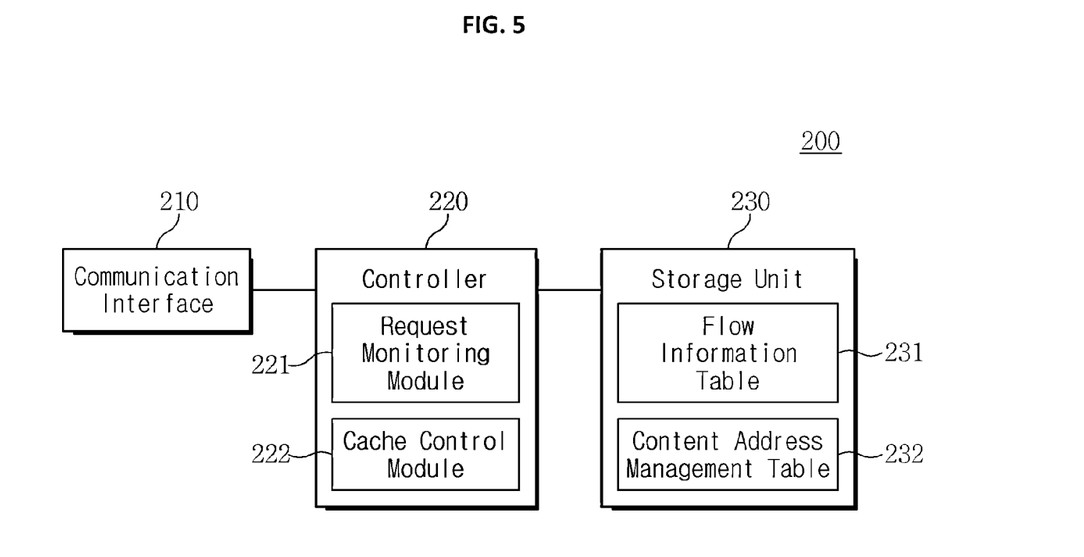
FIG. 5 is a schematic block diagram of a local caching device in accordance with at least one embodiment.

FIG. 5 is a schematic block diagram of a local caching device in accordance with at least one embodiment.

Referring to FIG. 5, the local caching device 200 includes a communication interface 210, a controller 220, and a storage unit 230.

The communication interface 210 is connected to the network 400 to transmit or receive data through the network 400. Particularly, the communication interface 210 is connected to the network 400 through which data is transmitted between at least one content provider 300 and at least one user terminal 100, and transmits or receives data to or from the content provider 300 and the user terminal 100 through the network 400. The communication interface 210 may include one or more communication modules that process transmission and reception in a wired or wireless manner according to the type of the network 400. The communication interface 210 also can communicate to each other and various networks including, but not limited to, cellular, Wi-Fi, LAN, WAN, CDMA, WCDMA, GSM, LTE and EPC networks, and cloud computing networks.

The storage unit 230 stores some or all contents provided from at least one content provider 300 to at least one user terminal 100. Additionally, the storage unit 230 may further store the flow information table 231 that manages information about a flow of a currently activated session corresponding to a cache hit, and the content address management table 232 that manages content address information about one or more contents stored in the storage unit 230. The flow information table 231 and the content address management table 232 may be constructed as shown in FIG. 4 and managed by the controller 220.

The controller 220 controls the overall caching service operation of the local caching device 200. Upon reception of a content request message from the user terminal 100 through the communication interface 210, the controller 220 checks whether the requested content is stored in the storage unit 230. If stored (i.e., a cache hit), the controller 220 retrieves the requested content from the storage unit 230 and provides the requested content to the user terminal 100 in place of the content provider 300. If not stored, the controller 220 receives the requested content from the content provider 300 and delivers the received content to the user terminal 100 while storing the received content in the storage unit 230.

For the above processing, the controller 220 may have a request monitoring module 221 and a cache control module 222.

The request monitoring module 221 monitors all content request messages being transmitted from the user terminal 100 to the content provider 300. Specifically, the request monitoring module 221 not only delivers to the content provider 300 all the content request messages received from the user terminal 100, but also extracts information, e.g., source address information, destination address information, URL information corresponding to the requested content, etc., regarding all content request messages transmitted from the user terminal 100 to the content provider 300.

The cache control module 222 stores (i.e., caches), in the storage unit 230, contents being transmitted from the content provider 300 to the user terminal 100. Specifically, the cache control module 222 receives, as a response to the content request message, a response of a particular flow transmitted from the content provider 300 to the user terminal 100 and stores it in the storage unit 230. At this time, the cache control module 222 obtains information about the particular flow by querying the request monitoring module 221, tags URL information which is one of the obtained information and corresponds to content address information associated with relevant content, and stores them.

Meanwhile, a process of determining whether the requested content is stored is performed as follows.

When a content request message being transmitted from the user terminal 100 to the content provider 300 is received, the controller 220 receives at least part of the content transmitted from the content provider 300 in response to a content request, and then based on the received part of the content, determines whether the requested content data is stored in the storage unit 230 (i.e., whether there is a cache hit or not). As the result of determination, if the requested content data is stored in the storage unit 230, the controller 220 checks whether the stored content data is a part of adapted type content. This may be performed by checking whether a file name recorded in a URL corresponding to content address information has a specific filename extension (e.g., ts) or checking whether there is a past record that continuous content requests occur more than a given number of times with regard to corresponding content.

As the result of the check, if the content data of a current cache hit is a part of adapted type content, the controller 220 extracts flow information corresponding to the content data and then stores as a flow of a cache hit in the flow information table 231. At this time, by counting a cache hit or not of each flow, the controller 220 may register flow information of only a flow of continuous cache hits more than a given number of times in the flow information table 231.

Additionally, as to a content request regarding a flow registered in the flow information table 231, the controller 220 changes a way of determining whether the requested content is stored in the storage unit 230, namely, determines based on content address information.

Specifically, the controller 220 compares flow information contained in the content request message with flow information of a previous cache hit. If both are identical to each other, the controller 220 determines, based on content address information of the requested content, whether the requested content is stored in the storage unit 230.

For this, the request monitoring module 221 of the controller 220 monitors content request messages from the user terminal 100 and notifies the cache control module 222 of a content request having the same flow information as registered in the flow information table 231 such that the cache control module 222 determines a cache hit or not on the basis of content address information corresponding to the request. As the result of determination based on content address information, if the requested content is stored in the storage unit 230, the cache control module 222 transmits the requested content to the user terminal 100 in place of the content provider 300.

If the requested content is not stored in the storage unit 230, the controller 220 delivers the content request message to the content provider 300. Then the controller 220 receives the requested content from the content provider 300 and then, based on at least part of the received content, determine again whether the requested content is stored in the storage unit 230.

If it is still determined that the requested content is not stored in the storage unit 230, the controller 220 continues to receive the content from the content provider 300, transmits the received content to the user terminal 100, and stores the received content in the storage unit 230.

If it is newly determined, based on at least part of the received content, that the requested content is stored in the storage unit 230, the controller 220 requests the content provider 300 to stop content transmission. This reduces traffic in the section between the content provider 300 and the local caching device 200. A message for requesting a stop of content transmission may be HTTP RST (Reset) message, for example.

Additionally, during the above process, the controller 220 not only further records, in the content address management table 232, at least one of content address information of the requested content and content identification information created using at least part of content received from the content provider 300, but also further records, in the flow information table 231, flow information extracted from the content request message of the user terminal 100. Further recorded information will be used in subsequent content requests.

Now, a content caching service method will be described in detail with reference to FIG. 6.

Figure 6:
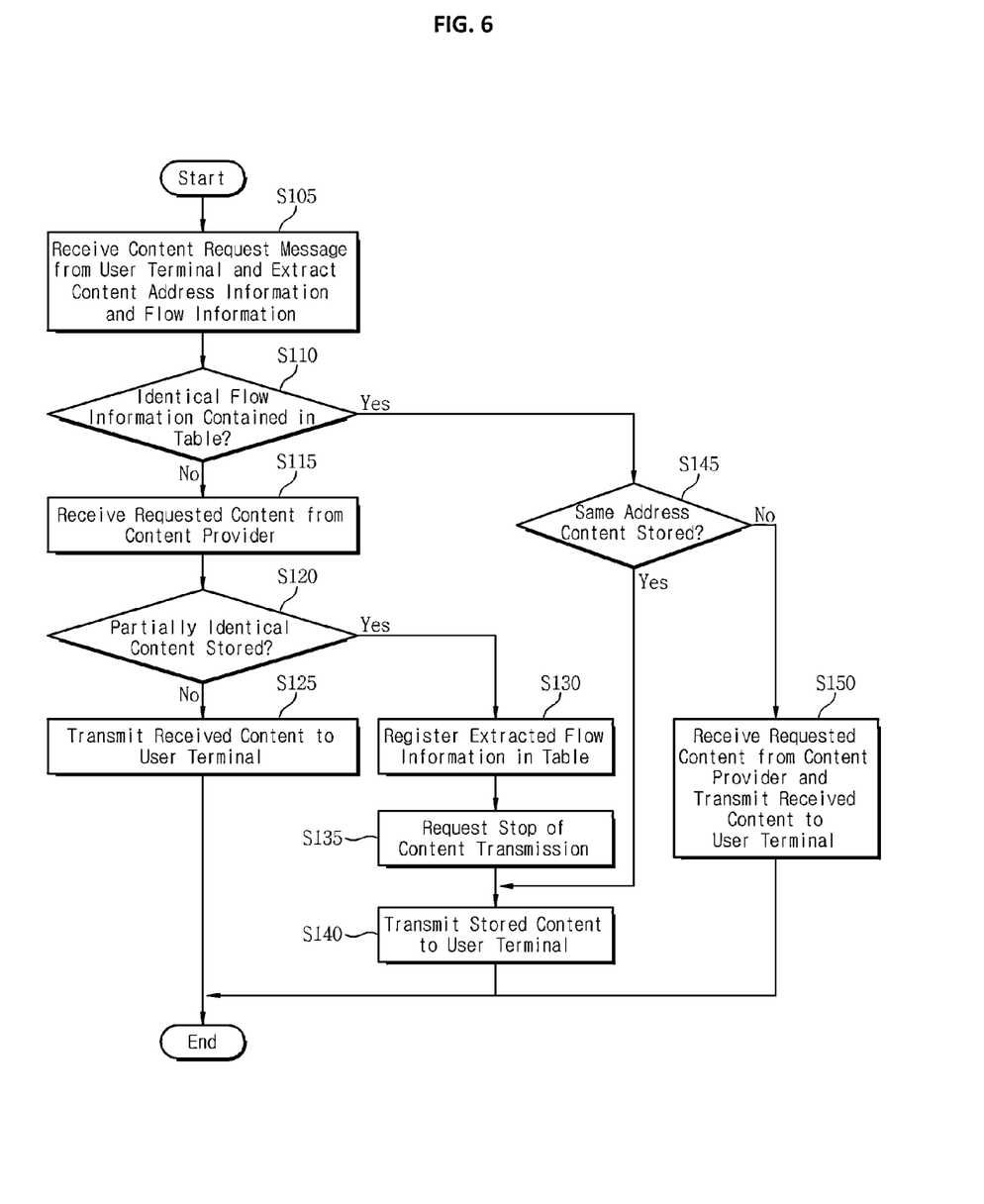
FIG. 6 is a flow diagram of a method for providing a content caching service in accordance with at least one embodiment.

FIG. 6 is a flow diagram of a method for providing a content caching service in accordance with at least one embodiment.

As discussed above, the local caching device 200 has the flow information table 231 and the content address management table 232, manages flow information regarding contents of previous cache hits through the flow information table 231, and manages content identification information and content address information regarding contents stored in the storage unit 230 through the content address management table 232. In some embodiments, flow information registered in the flow information table 231 is flow information regarding adapted type contents and may be flow information regarding currently activated session.

In some embodiments, when the user terminal 100 requests content, the local caching device 200 receives at least part of the requested content from the content provider 300 and, based on the received parts, determines whether the requested content is stored in the storage unit 230. If stored, the local caching device 200 registers flow information of the requested content in the flow information table 231. Thereafter, as to content having the same flow information as registered in the flow information table 231, the local caching device 200 determines whether the requested content is stored in the storage unit 230, based on content address information instead of relying upon received parts of the content. Therefore, the local caching device 200 can effectively determine a cache hit or not of adapted type content that is divided into a plurality of chunks and requested and transmitted by the chunks.

For example, as shown in FIG. 6, the local caching device 200 receives a content request message being transmitted from the user terminal 100 to the content provider 300 and extracts, from the content request message, flow information and content address information regarding the requested content (step S105). Here, the content request message may be an HTTP GET message, for example.

Additionally, the local caching device 200 determines, by comparison, whether the flow information table 231 contains flow information identical to the extracted flow information (step S110). Here, the flow information registered in the flow information table 231 is flow information regarding content of a previous cache hit. For example, any content data of certain adapted type content 10 as shown in FIG. 3 has been requested and determined as a cache hit, flow information regarding the adapted type content 10 is registered in the flow information table 231. Thereafter, if a content request message that requests other content data of the adapted type content 10 is received, flow information extracted from this content request message becomes identical to that registered in the flow information table 231.

Therefore, as the result of determination at step S110, if the flow information table 231 contains flow information identical to the extracted flow information, the local caching device 200 determines, based on content address information (e.g., URL) extracted from the content request message, whether the requested content is stored in the storage unit 230 (step S145).

As the result of determination at step S145, if content having the same address information as the extracted content address information is stored in the storage unit 230, the local caching device 200 transmits the stored content to the user terminal 100 (step S140).

In contrast, as the result of determination at step S145, if content having the same address information as the extracted content address information is not stored in the storage unit 230, the local caching device 200 receives the requested content from the content provider 300, delivers the received content to the user terminal 100, and stores the received content in the storage unit 230 (step S150).

Meanwhile, as the result of comparison of flow information at step S110, if the flow information table 231 does not contain flow information identical to the extracted flow information, the local caching device 200 receives the requested content from the content provider 300 (step S115), and then determines whether the storage unit 230 stores any content at least partially identical to the received content (step S120). This step S120 may be performed by searching the content address management table 232 by means of content identification information created using at least part of the received content.

As the result of determination at step S120, if the identical content is not stored, it is eventually determined that the requested content is not stored in the local caching device 200. Therefore, the local caching device 200 receives the requested content from the content provider 300, delivers the received content to the user terminal 100, and stores the received content in the storage unit 230 (step S125).

In contrast, as the result of determination at step S120, if the at least partially identical content is stored in the storage unit 230, the local caching device 200 registers the flow information extracted from the content request message in the flow information table 231 (step S130).

In some embodiments, this step S130 may be performed only for adapted type contents. For this case, the local caching device 200 may further perform step of determining whether the requested content is adapted type content, and if so, may perform step S130. In order to confirm adapted type content, the local caching device 200 may check a filename extension recorded in content address information of the requested content. Alternatively, the local caching device 200 may analyze content requests and cache hits with regard to flow information. If content has been requested more than a given number of times and stored in the storage unit 230, the local caching device 200 may perform step S130.

In alternative embodiments, step S130 may be performed simultaneously with or after one of steps S135 and S140.

Additionally, if any content at least partially identical to the received content is stored in the storage unit 230, the local caching device 200 may request the content provider 300 to stop content transmission (step S135).

Also, if any content at least partially identical to the received content is stored in the storage unit 230, the local caching device 200 retrieves the content from the storage unit 230 and transmits the stored and retrieved content to the user terminal 100 (step S140).

Meanwhile, as to any content stored in the storage unit 230 at steps S125 and S150, the local caching device 200 creates content identification information by using at least part of the content, extracts content address information, and registers the extracted content address information in the content address management table 232 such that the extracted content address information registered therein may be used later in determining whether the same content is requested.

The above-discussed process may be performed in case where the requested content is cached as adapted type content without a change of an encryption key, and the local caching device 200 may reduce traffic by using cached contents. Namely, the local caching device 200 transmits first a part of content received for determining content caching or not. After determination of caching or not, the local caching device 200 retrieves subsequent data from the storage unit 230 and transmits the stored and retrieved subsequent data to the user terminal 100.

As discussed above, in case of adapted type content cached in the local caching device 200, if determination based on a part of content results in a cache hit, and if a content request message sequentially occurs regarding the remaining data of the adapted type content, at step S120, source address information extracted from the content request message becomes identical to flow information of a previous cache hit.

If any content data of the adapted type content 10 as shown in FIG. 3 is requested, the local caching device 200 determines caching or not of the requested content by comparing a part of content. If the requested content is cached, the local caching device 200 registers flow information for identifying the adapted type content 10 in the flow information table 231. Therefore, when the other content data of the adapted type content 10 is requested, the local caching device 200 can determine caching or not through a simple comparison of content address information only.

As discussed above, when the local caching device 200 distributed on the network 400 caches some or all contents of the content provider 300 and then provides cached content to the user terminal 100 in place of the content provider 300 in response to a request for the same content, the local caching device 200 checks whether flow information contained in the content request message is identical to that of a previous cache hit. If identical, the local caching device 200 determines caching or not of the requested content on the basis of address information of the requested content. If not identical, the local caching device 200 receives the requested content from the content provider 300 and then determines caching or not of the requested content on the basis of at least part of the received content. This enhances efficiency of cache hit determination processing.

Particularly, as to adapted type content that is divided into chunks and periodically changes an encryption key for content, this technique disclosed herein may reduce the time required to determine the existence of the same content and also realize more efficient service operation.

The method of providing content caching service according to some embodiments of the present disclosure is implemented as program commands that can be executed by various computer systems and be recorded in any non-transitory, and written to a computer-readable recording medium. The computer-readable recording medium includes programs, data files, data structures, etc. alone or in combination. The program commands written to the medium are designed or configured especially for the present disclosure, or known to those skilled in computer software. Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program command, such as a ROM, a RAM, and a flash memory. Examples of a program command include a premium language code executable by a computer using an interpreter as well as a machine language code generated by a compiler. The hardware device is configured to operate as one or more software modules to implement the present disclosure or vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The detailed description of the preferred embodiments of the present disclosure has been given to enable those skilled in the art to implement and practice the disclosure. Although the disclosure has been described with reference to the various embodiments, those skilled in the art will appreciate that various modifications and variations can be made in the present disclosure without departing from the subject matter, the spirit and scope of the disclosure. Specific terms used in this disclosure and drawings are used for illustrative purposes and not to be considered as limitations of the present disclosure.

What is claimed is:

1. A local caching device, comprising:
   a storage unit configured to store some or all contents provided from at least one content provider to at least one user terminal;
   a communication interface configured to transmit and receive data between the at least one content provider and the at least one user terminal; and
   a controller configured to
      receive, from the content provider, content requested by the user terminal,
      register flow information of the requested content when the storage unit stores content which is at least partially identical to the received content,
         wherein the flow information includes source address information indicating a source of content of a cache hit, and destination address information indicating a destination of content of the cache hit, and
      determine whether the requested content is stored in the storage unit when content having the same flow information as the registered flow information is requested,
   wherein the storage unit is further configured to store a content address management table which includes:
      a first field configured to record content identification information including at least one of information extracted from at least part of contents stored in the local caching device and information hashed from at least part of the contents stored in the local caching device; and
      a second field configured to record one or more content URL address information matched with the content identification information, and
   wherein the content identification information includes all of
      prefix information having a predetermined length,
      a hash value obtained by processing the prefix information using a predetermined hash function, and
      metadata of the received content.

2. The local caching device of claim 1, wherein the controller is further configured to
   determine whether the received content is at least one part of adapted type content, and
   register flow information of the received content in a flow information table of the storage unit when the received content is the at least one part of adapted type content.

3. The local caching device of claim 1, wherein the controller is further configured to register the flow information of the received content in a flow information table of the storage unit when the content is requested more than a given number of times and stored in the storage unit.

4. The local caching device of claim 1, wherein, when content at least partially identical to the received content or content corresponding to content address information is not stored in the storage unit, the controller is further configured to
   receive the requested content from the content provider,
   transmit the received content to the user terminal, and
   store the received content in the storage unit.

5. The local caching device of claim 1, wherein when content at least partially identical to the received content is stored in the storage unit, the controller is further configured to request the content provider to stop content transmission.

6. The local caching device of claim 1, wherein the controller is further configured to
   extract the flow information corresponding to the received content, and
   store the extracted flow information as a flow of the cache hit in a flow information table of the storage unit.

7. The local caching device of claim 6, wherein the controller is further configured to
   count a cache hit or not of each flow, and
   register the flow information of a flow of continuous cache hits more than a given number of times in the flow information table of the storage unit.

8. The local caching device of claim 1, wherein the controller further comprises
   a request monitoring module configured to monitor some or all content request messages being transmitted from the at least one user terminal to the at least one content provider, and
   a cache control module configured to store, in the storage unit, some or all contents being transmitted from the at least one content provider to the at least one user terminal.

9. The local caching device of claim 1, wherein the source address information includes IP address information of the source, and the destination address information include IP address information and port information of the destination.

10. A method of providing a content caching service, the method performed by a local caching device and comprising:

receiving, from a content provider, at least one part of content requested by a user terminal;

determining whether the requested content is stored in a storage unit of the local caching device, based on the received at least one part of the requested content;

registering flow information of the requested content in a flow information table of the storage unit when the requested content is stored in the storage unit,
wherein the flow information includes source address information indicating a source of content of a cache hit, and destination address information indicating a destination of content of the cache hit, and when content having the same flow information as the registered flow information is requested, determining whether the requested content is stored in the storage unit, based on content address information;

matching, for the stored content, content identification information created using at least one part of the received content and the content URL address information of the received content; and storing the matched information in a content address management table of the storage unit, wherein the content address management table includes:
a first field records the content identification information including at least one of information extracted from at least part of contents stored in the local caching device and information hashed from at least part of the contents stored in the local caching device; and
a second field records one or more the content URL address information matched with the content identification information, and wherein the content identification information includes all of
prefix information having a predetermined length,
a hash value obtained by processing the prefix information using a predetermined hash function, and
metadata of the received content.

11. The method of claim 10, wherein the registering of the flow information includes
when the content corresponding to the flow information is requested more than a given number of times and stored in the storage unit, registering the flow information in the flow information table of the storage unit.

12. The method of claim 10, wherein the registering of the flow information includes
determining whether the received content is a part of adapted type content, and
registering the flow information of the requested content in the flow information table of the storage unit when the received content is a part of adapted type content.

13. The method of claim 10, further comprising:
determining whether the requested content is stored in the storage unit, based on the content address information or at least one part of the received content; and
transmitting the stored content to the user terminal when the requested content is determined as stored in the storage unit.

14. The method of claim 10, further comprising:
determining whether the requested content is stored in the storage unit, based on the content address information or at least one part of the received content;
when the requested content is determined as not stored in the storage unit,
receiving the requested content from the content provider; and
transmitting the received content to the user terminal while storing the received content in the storage unit.

15. A system of providing a content caching service, comprising:
a content provider configured to providing some or all contents; and
a local caching device configured to communicate with the content provider, the local caching device including:
a storage unit configured to store the provided some or all contents provided to at least one user terminal;
a communication interface configured to transmit and receive data between the at least one content provider and the at least one user terminal; and
a controller configured to
receive, from the content provider, content requested by the user terminal,
register flow information of the requested content when the storage unit stores content which is at least partially identical to the received content,
wherein the flow information includes source address information indicating a source of content of a cache hit, and destination address information indicating a destination of content of the cache hit, and
wherein the source address information includes IP address information of the source, and the destination address information include IP address information and port information of the destination, and
determine whether the requested content is stored in the storage unit when content having the same flow information as the registered flow information is requested,
wherein the storage unit is further configured to store a content address management table which includes:
a first field configured to record content identification information including at least one of information extracted from at least part of contents stored in the local caching device and information hashed from at least part of the contents stored in the local caching device; and
a second field configured to record one or more content URL address information matched with the content identification information, and
wherein the content identification information includes all of
prefix information having a predetermined length,
a hash value obtained by processing the prefix information using a predetermined hash function, and
metadata of the received content.

* * * * *